(12) United States Patent
Nakajima et al.

(10) Patent No.: US 6,529,875 B1
(45) Date of Patent: Mar. 4, 2003

(54) VOICE RECOGNIZER, VOICE RECOGNIZING METHOD AND GAME MACHINE USING THEM

(75) Inventors: Takuya Nakajima, Tokyo (JP); Kazuhiko Hamada, Tokyo (JP)

(73) Assignee: Sega Enterprises Ltd., Tokyo (JP)

( * ) Notice: Subject to any disclaimer, the term of this patent is extended or adjusted under 35 U.S.C. 154(b) by 0 days.

(21) Appl. No.: 09/029,561

(22) PCT Filed: Jul. 11, 1997

(86) PCT No.: PCT/JP97/02421
§ 371 (c)(1),
(2), (4) Date: Mar. 2, 1998

(87) PCT Pub. No.: WO98/02223
PCT Pub. Date: Jan. 22, 1998

(30) Foreign Application Priority Data

Jul. 11, 1996 (JP) .............................. 8-182495

(51) Int. Cl.[7] .............................. G10L 15/00
(52) U.S. Cl. ...................................... 704/275
(58) Field of Search ............... 704/270, 275, 704/231

(56) References Cited

U.S. PATENT DOCUMENTS

| | | | | |
|---|---|---|---|---|
| 4,357,488 A | * | 11/1982 | Knighton ................... | 704/275 |
| 4,704,696 A | * | 11/1987 | Reimer et al. ............... | 704/275 |
| 5,091,947 A | * | 2/1992 | Ariyoshi et al. ............. | 704/246 |
| 5,583,965 A | * | 12/1996 | Douma et al. ............... | 704/275 |
| 5,842,168 A | * | 11/1998 | Miyazawa ................... | 704/275 |
| 5,893,064 A | * | 4/1999 | Kudirka et al. .............. | 704/275 |
| 6,038,534 A | * | 3/2000 | Richards ..................... | 704/275 |
| 6,175,820 B1 | * | 1/2001 | Dietz ......................... | 704/235 |

FOREIGN PATENT DOCUMENTS

| | | |
|---|---|---|
| JP | 64-23299 | 1/1989 |
| JP | 2-13587 | 1/1990 |
| JP | 4-276280 | 1/1992 |
| JP | 6-315572 | 11/1994 |
| JP | 7-175567 | 7/1995 |
| JP | 7-222868 | 8/1995 |
| JP | 8-123448 | 5/1996 |

* cited by examiner

Primary Examiner—David D. Knepper
(74) Attorney, Agent, or Firm—Keating & Bennett, LLP

(57) ABSTRACT

A voice recognition device used as a peripheral device for a game machine including a voice input device, a voice recognition section for recognizing the player's voice by comparing the voice signal output from the voice input device with data from previously defined voice recognition dictionaries and generating control signals relating to the game on the basis of the recognition result. The voice recognition section includes a non-specific speaker voice recognition dictionary which is previously defined for unspecified speakers, and a specific speaker voice recognition dictionary which is defined by the player.

20 Claims, 6 Drawing Sheets

VOICE RECOGNIZER, VOICE RECOGNIZING METHOD AND GAME MACHINE USING THEM

TECHNICAL FIELD

This invention relates to a voice recognition device and voice recognition method for recognizing input voices, and a game machine using same.

BACKGROUND ART

With the progress of computer technology in recent years, video game machines using computer graphics technology have become widely used. A wide variety of different game software has been developed recently, so domestic video game machines of this kind have become extremely popular as a form of entertainment. In a video game machine of this kind, characters are moved and the game screen is changed by operating buttons on a controller.

In a conventional video game device, all game instructions are given by means of the player operating controller switches. However, for humans, the most natural means of communication is the voice. Therefore, various attempts have been made to recognize the human voice and to control machines on the basis of these recognition results For example, attempts have been made to control cars, robots, or the like by means of the human voice, or to control various electronic devices by vocal commands.

However, when it is sought to apply a conventional voice recognition device to a video game machine, the device must conform to the characteristics of the game machine, unlike the case of general electronic devices, and it must be adapted before application. For example, when the player presses a button on the game machine controller, rather than pressing the button just once, the degree of movement of the character can be changed by pressing the button for a long time or pressing it repeatedly, and the character can be made to perform special actions by pressing the button simultaneously with another button, for example. It is also important that the device has a good response. On the other hand, in some types of game, the accuracy of recognition may not be particularly important, indeed, the fact that the device cannot recognize the player's voice very well may itself increase the enjoyment of the game.

In brief, for the player to enjoy the game, it is necessary to provide particular characteristics and functions which differ from those in a conventional voice recognition device. A voice recognition device which satisfies these demands is not known in the prior art.

This invention was devised in order to resolve the related problems, an object thereof being to provide a voice recognition device and voice recognition method suited for a game.

It is a further object of this invention to provide a game machine using this voice recognition device and voice recognition method.

DISCLOSURE OF INVENTION

In a voice recognition device used as a peripheral device for a game machine, the voice recognition device relating to this invention comprises voice input means, and a voice recognition section for recognizing the player's voice by comparing the voice signal output from this voice input means with data from previously defined voice recognition dictionaries, and generating control signals relating to the game on the basis of the recognition result.

In the voice recognition device relating to this invention, the voice recognition section comprises a non-specific speaker voice recognition dictionary, which is previously defined for unspecified speakers, and a specific speaker voice recognition dictionary which is defined by the player, and in its initial state, the device selects the non-specific speaker voice recognition dictionary.

In the voice recognition device relating to this invention, the voice recognition section comprises a plurality of specific speaker voice recognition dictionaries corresponding respectively to a plurality of players, and one of these specific speaker voice recognition dictionaries is selected by an action of the player as the dictionary to be used for voice recognition processing.

The voice recognition device relating to this invention comprises a game machine control section connected to the voice recognition section, and the voice recognition section generates control signals relating to the game by combining voice recognition results and control signals from the control section.

In the voice recognition device relating to this invention, the control section outputs control signals for implementing normal actions, and the voice recognition section generates control signals for implementing special actions.

"Normal actions" are actions normally implemented by the player in the game (for example, kicking, jumping, etc.) "special actions" are particular actions which are made possible by the combination of signals from the control section and voice recognition signals. For example, in a fighting game, by a combination of a raised voice+operation of button A, the player may implement an action whereby the same move is repeated, or a particular deathblow which can be produced only when a plurality of buttons are pressed simultaneously.

In the voice recognition device relating to this invention, the voice recognition section outputs a value indicating the state of the voice signal and a similarity level indicating the degree of similarity between the voice signal output from the voice input means and the contents of the voice recognition dictionary, and the voice recognition section has a first operating mode, wherein voice recognition is conducted on the basis of the similarity level in order to select the type of game action, and a second operating mode, wherein no voice recognition is conducted and the state of the voice signal is measured in order to set the state of the action.

In the second mode, the voice recognition device relating to this invention takes the average sound level of a part or all of the voice signal as the state of the voice signal, and sets the state of the game action on the basis of this average sound level.

In the second mode, the voice recognition device relating to this invention takes the peak sound level of the voice signal as the state of the voice signal, and sets the state of the game action on the basis of this peak sound level.

In the second mode, the voice recognition device relating to this invention takes the voice signal rise time as the state of the voice signal, and sets the state of the game action on the basis of this rise time.

In the second mode, the voice recognition device relating to this invention takes the voice signal continuation time as the state of the voice signal, and sets the state of the game action on the basis of this continuation time.

In the second mode, the voice recognition device relating to this invention takes the type of voice as the state of the voice signal, and sets the state of the game action on the basis of this voice type.

In the voice recognition device relating to this invention, the voice recognition section outputs a similarity level indicating the degree of similarity between the voice signal output from the voice input means and the contents of the voice recognition dictionary, and the corresponding volume level, evaluates-this volume level on the basis of a predetermined rejection level, and rejects the recognition result from the voice recognition section depending on this evaluation result.

The voice recognition device relating to this invention sets a rejection level for each type of game or each game stage.

In the voice recognition device relating to this invention, the voice recognition section performs voice recognition on the basis of the similarity level indicating the degree of similarity between the voice signal output from the voice input means and the contents of the voice recognition dictionary, and changes the state of action in the game according to control signals generated on the basis of this recognition result, in response to this similarity level.

The game machine relating to this invention comprises the voice recognition device as a peripheral control device.

The voice recognition method relating to this invention comprises: a first step whereby a voice signal is received; a second step whereby the player's voice is recognized by comparing this voice signal with data from a previously defined voice recognition dictionary; and a third step whereby control signals relating to the game are generated on the basis of the recognition result from the second step.

The voice recognition method relating to this invention comprises a fourth step whereby control signals are received from the game machine control section, and in the third step, control signals relating to the game are generated by combining the voice recognition result from the second step and the control signals from the fourth step.

BEST MODE FOR CARRYING OUT THE INVENTION

First Mode for Implementing this Invention

Figure 1:
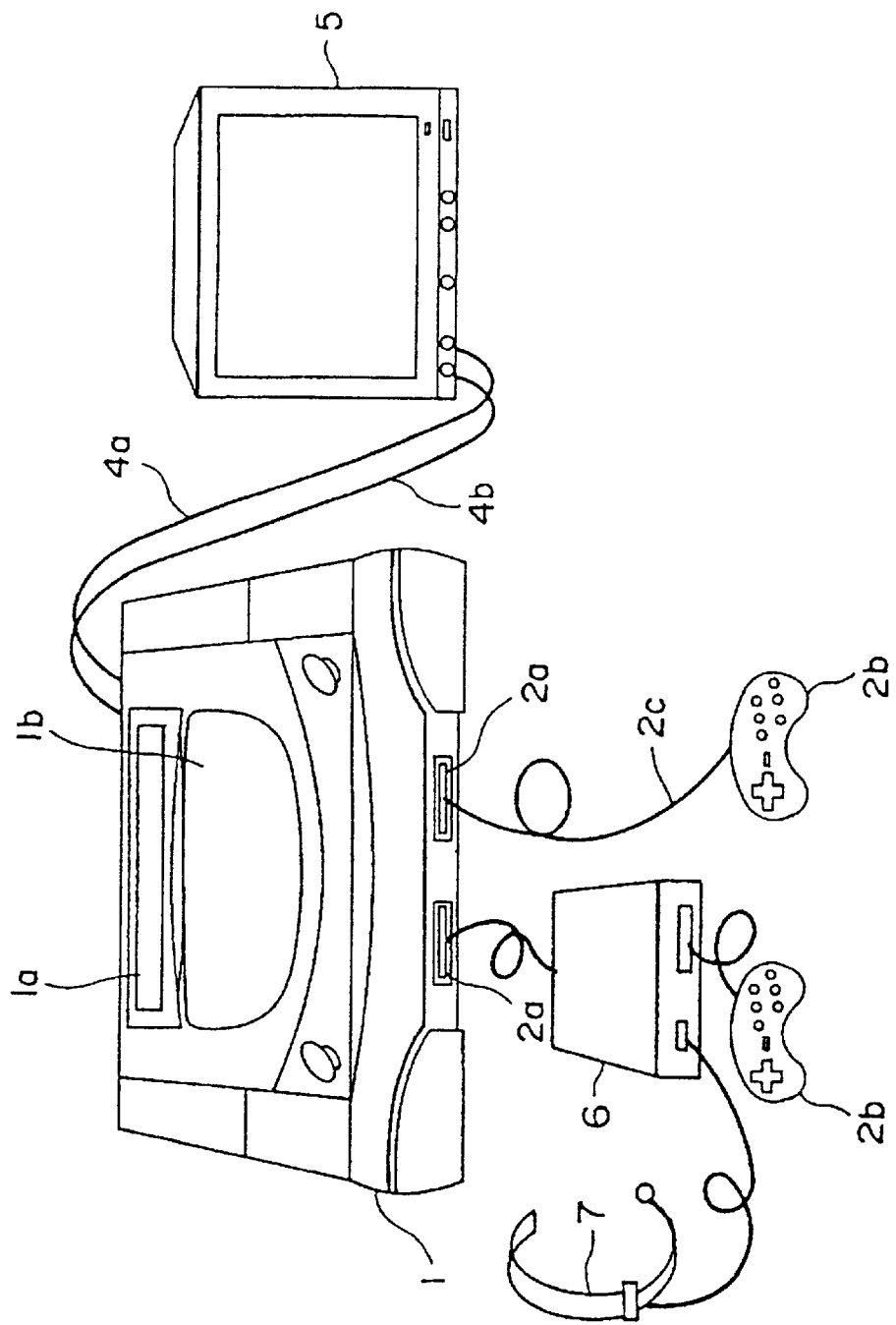
FIG. 1 is an external view of a game system using a video game machine relating to a first mode for implementing this invention.

FIG. 1 is an external view of a video game machine using a voice recognition device relating to a mode for implementing this invention. In this diagram, the video game machine main unit 1 is approximately box-shaped and it contains circuit boards and the like for game processing. The front face of the video game machine main unit 1 is provided with two connectors 2a and a PAD 2b for controlling the game is connected to one of these connectors 2a via a cable 2c. The other connector 2a is connected to a voice recognition section 6. A PAD 2b and a microphone 7 for inputting the player's voice are connected to the voice recognition section 6. If two people are playing the game, then two PADS 2b are used. The microphone 7 shown in FIG. 1 is a headset microphone, but another type of microphone may be used. Furthermore, the voice recognition section 6 may be connected to both of the connectors 2a.

A cartridge I/F 1a and CD-ROM drive 1b are provided on the top of the video game machine main unit 1 for respectively connecting ROM cartridges and reading CD-ROMs, which serve as recording media on which game programs and voice recognition operations are recorded. Although omitted from the drawing, a video output terminal and audio output terminal are provided on the rear side of the video game machine main unit 1. The video output terminal is connected via a cable 4a to a video input terminal of a TV receiver 5, and the audio output terminal is connected via a cable 4b to an audio input terminal of the TV receiver 5. In a video game machine of this kind, the user can play a game by operating the PAD 2b whilst watching screens shown on the TV receiver 5.

Figure 2:
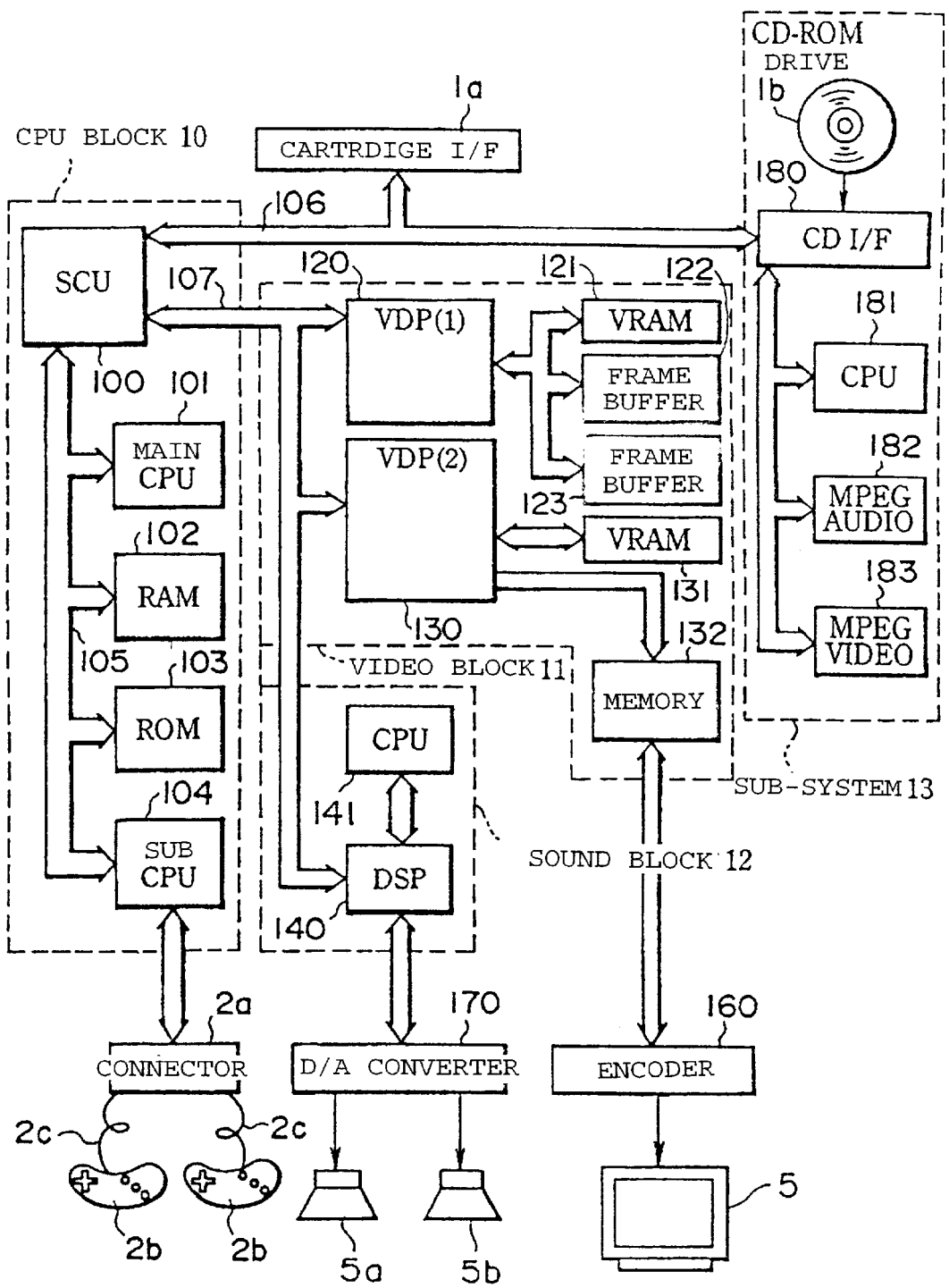
FIG. 2 is a functional block diagram of a video game machine relating to a first mode for implementing this invention.

FIG. 2 is a block diagram showing an overview of a TV game machine relating to this mode of implementation. The voice recognition section 6 and microphone 7 are not shown in FIG. 2. This image processing device comprises a CPU block 10 for controlling the whole device, a video block for controlling the display of game screens, a sound block 12 for generating sound effects, etc., and a subsystem 13 for reading CD-ROMs, and the like.

The CPU block 10 comprises an SCU (System Control unit) 100, main CPU 101, RAM 102, ROM 103, cartridge I/F 1a, sub-CPU 104, CPU bus 103, and the like. The main CPU 101 controls the whole device. This main CPU 101 comprises an internal calculating function similar to a DSP (Digital Signal Processor) and is capable of implementing applicational software at high speed. The RAM 102 is used as a work area for the main CPU 101. The ROM 103 stores initial programs and the like which are used for initialization processing. The SCU 100 conducts smooth data input and output between the main CPU 101, VDPs 120, 130, DSP 140, CPU 141, etc., by controlling buses 105, 106, 107. The SCU 100 is provided with an internal DMA controller and is capable of transferring sprite data for the game to the VRAM in the video block 11. Thereby, applicational software for a game, or the like, can be implemented at high speed. The cartridge I/F 1a is used for inputting applicational software supplied in ROM cartridge format.

The sub-CPU 104 is known as an SMPC (System Manager & Peripheral Control), and it is provided with a function for collecting peripheral data from the PADs 2b via the connectors 2a in response to requests from the main CPU 101. The main CPU 101 conducts processing such as moving a character on the game screen, for example, on the basis of peripheral data read in from the sub-CPU 104. A desired type of peripheral, including a PAD, joystick, keyboard, or the like, can be connected to the connectors 2a. The sub-CPU 104 is provided with a function whereby it automatically identifies the type of peripheral connected to a connector 2a (main unit terminal), and collects peripheral data and the like by means of a communications format which corresponds to the peripheral type.

The video block 11 comprises a VDP (Video Display Processor) 120 which draws characters etc. consisting of polygon data for the video game, and a VDP 130 which draws background screens, synthesizes the polygon image data and background images, and performs clipping, and other processes. VDP 120 is connected to a VRAM 121 and frame buffers 122, 123. Polygon picture data representing characters in the video game machine is transferred from the main CPU 101 via the SCU 100 to VDP 120, where it is written into VRAM 121. The picture data written into VRAM 121 is then drawn into picture frame buffer 122 or 123 in a 16 or 8 bit/pixel format, for example. The data drawn into frame buffer 122 or 123 is transferred to.VDP 130. The information for controlling the drawing process is supplied from the main CPU 101 via the SCU 100 to the VDP 120. The VDP 120 then implements drawing processes in accordance with these instructions.

The VDP 130 is connected to the VRAM 131 and is constructed such that picture data output from the VDP 130 is output to an encoder 160 via a memory 132. The encoder 160 generates a video signal by appending a synchronizing signal, or the like, to this image data, and outputs this signal to the TV receiver 5. Thereby, prescribed game screens are displayed on the TV receiver 5.

The sound block 12 comprises a DSP 140 which synthesizes sound by means of a PSM or FM system, and a CPU 141 which controls this DSP 140, and the like. Sound data generated-by the DSP 140 is converted to a two-channel signal by the D/A converter 170 and then output to speakers 5b.

The sub-system 13 comprises a CD-ROM drive b, CD I/F 180, CPU 181, MPEG AUDIO 182, MPEG VIDEO 183, and the like. This sub-system 13 is provided with a function whereby it reads in applicational software supplied in CD-ROM format and reproduces animated pictures, or the like. The CD-ROM drive 1b reads in data from a CD-ROM. The CPU 181 conducts processes such as controlling the CD-ROM drive 1b and correcting errors in the input data. The data read from the CD-ROM is supplied via a CD I/F 180, bus 106, and SCU 100 to the main CPU 101, and is used as applicational software. The MPEG AUDIO 182 and MPEG VIDEO 183 are devices which restore data compressed according to MPEG (Motion Picture Expert Group) standards. By using the MPEG AUDIO 182 and MPEG VIDEO 183 to restore MPEG-compressed data written onto a CD-ROM, it is possible to reproduce animated pictures.

Figure 3:
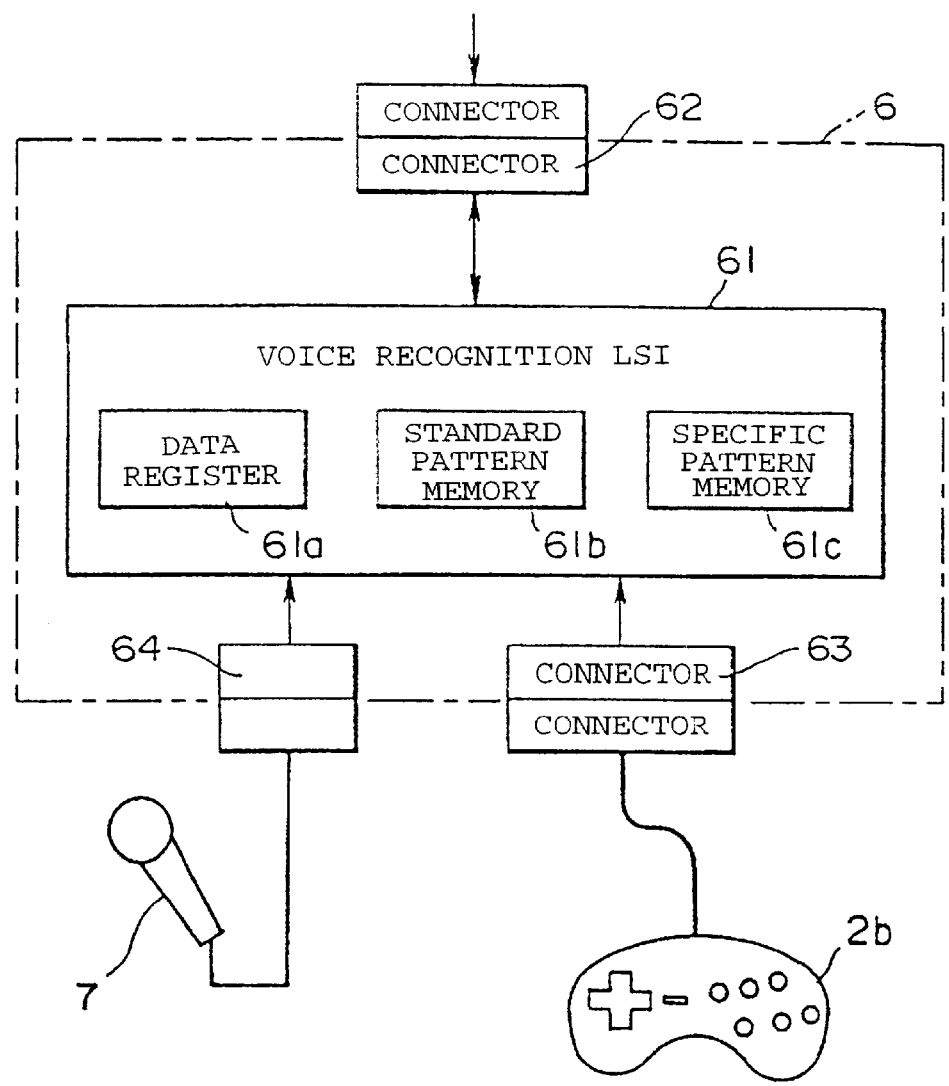
FIG. 3 is a functional block diagram of a voice recognition section relating to a first mode for implementing this invention.

FIG. 3 is a block diagram showing the internal composition of a voice recognition section 6. The voice recognition section 6 is a voice recognition subsystem for individual words (words used independently, such as "sun" or "sea", etc.), which is provided with a word spotting function that corresponds to unspecified speakers and can recognize anyone's voice, rather than requiring the user to register his or her own voice. In the diagram, connector 62 is connected via cable 2c to connector 2a in FIG. 2. Furthermore, connectors 63 and 64 are connected respectively to PAD 2b and microphone 7. Connectors 62–64 are connected to a voice recognition LSI 61 (model: RL5C288: manufactured by Ricoh Co. Ltd.). The voice recognition LSI 61 conducts voice recognition processing on the basis of voice signals input from the microphone 7, and it transfers data from PAD 2b to the main unit CPU block 10. Processing is also conducted to combine the control data from the PAD 2b with the voice recognition result. By connecting a compatible peripheral to the expansion port (connector 63), simultaneous voice and manual operation are possible. The voice recognition LSI 61 comprises a data register 61a for storing parameter data etc. for voice recognition processing, a standard pattern memory 61b for storing standard patterns for voice recognition, and a specific pattern memory 61c for voice recognition of a specific speaker.

The voice recognition section 6 previously classifies (by clusters) the spectral series of a plurality of speakers for each word, and it takes the centre of each cluster or the average spectral series of the voices belonging to each cluster as standard patterns (multi-templates). Input voices are matched with each standard pattern to calculate a similarity level. The similarity level is contained as data in the recognition result and it indicates the distance between the vocal sound made by the user and word resulting from the recognition process. The higher its value, the greater the similarity. A standard pattern word having a high similarity level is output as a voice recognition result. Standard pattern dictionary data is downloaded from the game machine 1. Furthermore, as well as the word similarity level, the received sound volume is also output as part of the recognition result. The received sound volume is a value indicating the level of the input voice, and by this means is it possible to measure the loudness of the vocal sound made by the user. The higher the value, the greater the volume.

The voice recognition section 6 has the following characteristics.

Recognition type: Individual spoken word; speaker type: unspecified speaker; recognition system: DST model; number of recognized words: 30 standard words for unspecified speaker (number of recognized words can change with the total number of moras); recognition processing time: 0.2 seconds or more from end of speaking (depends on applicational software); word length: 0.15–2.00 seconds (including meaningless words); clustering system: bit assignment system; number of clusters: maximum 16; rejection levels: 8 stages (0 (lowlevel)–7 (high level)); word connection: minimum 30 (number of combined words may change with number of moras), microphone amplifier gain: variable.

Figure 4:
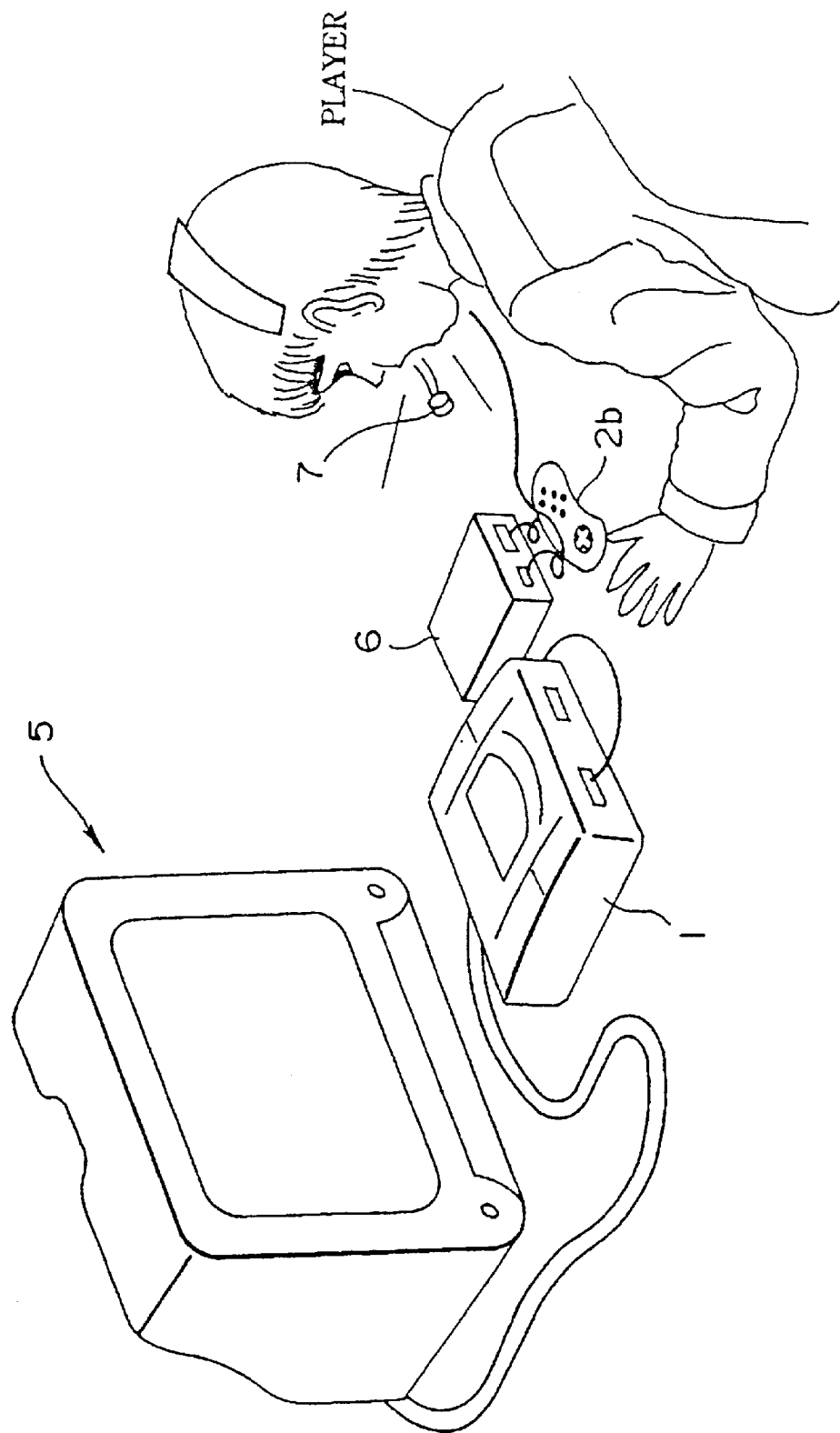
FIG. 4 is an illustrative diagram of operational states of a game system using a video game machine relating to a first mode for implementing this invention.

FIG. 4 is a compositional example of a system using this game machine 1 and voice recognition section 6. The details are described later, but the player (PLAYER) can implement various actions by operating the PAD 2b and giving commands via the microphone 7, whilst watching the screen of the TV receiver 5.

Figure 5:
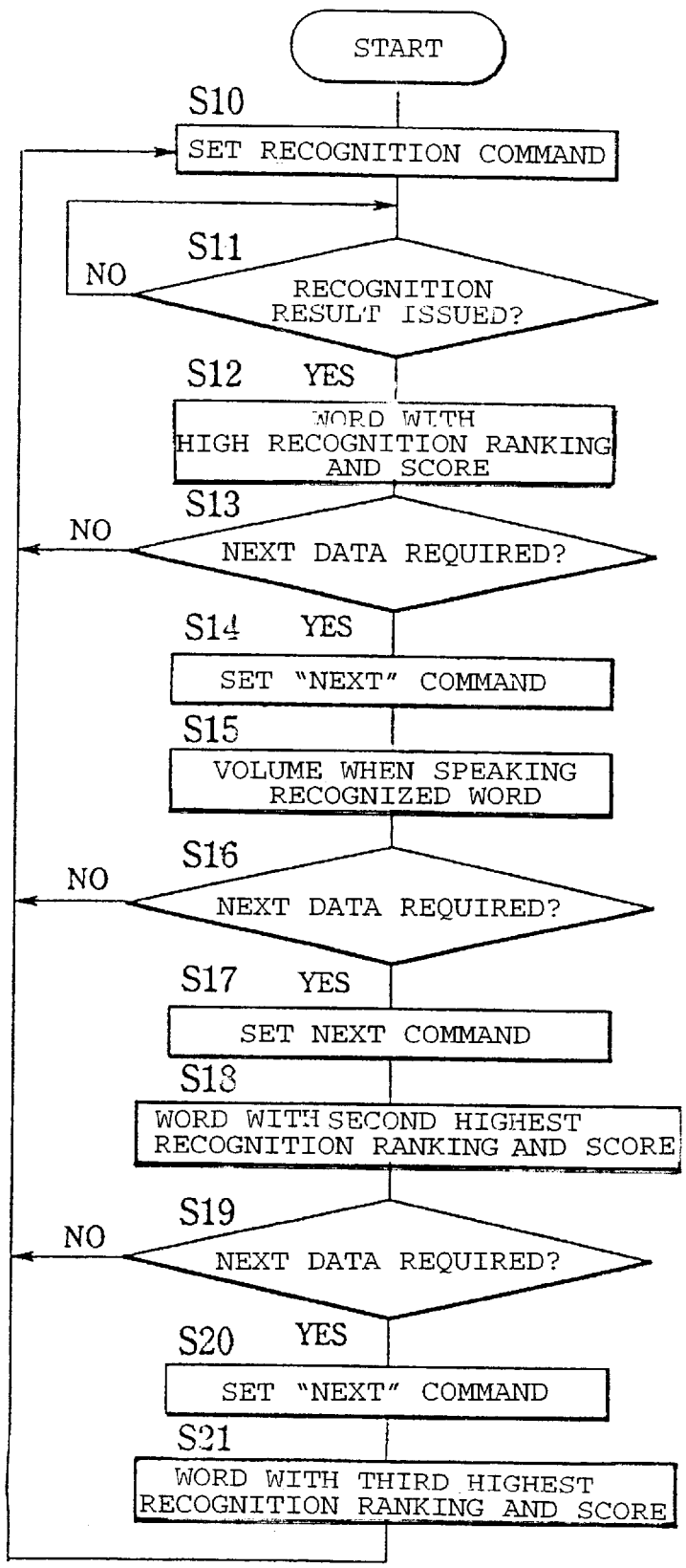
FIG. 5 is a flowchart for describing the action of a voice recognition section relating to a first mode for implementing this invention.

FIG. 5 is a flowchart of the basic processing in voice recognition. In the following description, "word" does not mean a word in a strict grammatical sense, but rather denotes a single unit used in voice recognition, including short items, such as a person's name or a letter, or long items, such as a phrase or sentence, etc.

Firstly, a recognition command is set in the data register 61a (step S10). The device then waits until the voice recognition LSI 61 outputs a recognition result (step S11).

Having received a recognition command, the voice recognition LSI 61 stores a recognition result in data register 61a when a voice of a prescribed volume level or above has continued for a prescribed period of time, and it informs the game machine main unit 10 that a recognition result has been output.

When a recognition result has been output, the word having the highest recognition ranking, which is regarded to be the most similar of the plurality of standard patterns, is read out from data register 61a, along with are recognition score (step S12). The recognition score expresses the similarity between the input voice and the word having the highest recognition ranking in the form of a points score. The higher the recognition score, the greater the resemblance to the input voice.

Next, it is determined whether or not more detailed data is required (step S13), and if data is not required, the procedure returns to step S10.

If data is required, a "next" command is set in data register 61a (step S14). In accordance with the "next" command, the voice recognition LSI 61 stores volume data for the spoken recognized word in data register 61a. The game machine main unit 10 reads out the volume data from the data register 61a (step S15).

Next, it is determined whether or not more detailed data is required (step S16), and if data is not required, the procedure returns to step S10.

If data is required, a"next" command is set in data register 61a (step S17). In accordance with the "next" command, the voice recognition LSI 61 stores the word having the second highest recognition ranking and the corresponding recognition score in the data register 61a. The game machine main unit 10 reads out this word having the second highest recognition ranking and its recognition score from the data register 61a (step S18).

Next, it is determined whether or not more detailed data is required (step S19), and if data is not required, the procedure returns to step S10.

If data is required, a "next" command is set in data register 61a (step S20). In accordance with the "next" command, the voice recognition LSI 61 stores the word having the third highest recognition ranking and the corresponding recognition score in the data register 61a. The game machine main unit 10 reads out this word having the third highest recognition ranking and its recognition score from the data register: 61a (step S21).

In this way, it is possible to obtain the word having the highest recognition ranking and its recognition score as a recognition result from the voice recognition LSI 61, and depending on requirements, it is also possible to obtain more detailed recognition result data by means of a "next" command.

By means of the voice recognition processing described above, the voice recognition section 6 has the following functions.

Default Non-Specific Speaker Voice Recognition Function

The voice recognition section 6 switches between a default recognition mode and normal recognition mode (described later) according to a prescribed sequence. The object of the default recognition mode is to enable initial screens for operating a CD-ROM etc. displayed immediately after the device power has been turned on to be operated by voice. An internal ROM of the voice recognition LSI 61, which is omitted from the diagram, contains a word dictionary corresponding to each button of the PAD 2b, and if a corresponding word is recognized, the bit corresponding to each button is set to active (0). In this mode, initialization settings immediately after switching on the power, or the start of a game using a CD-ROM, etc. can be activated by voice.

The relationship between the word dictionary and corresponding buttons is shown below.

Relationship between default word.dictionary and corresponding buttons

| Pad button | Word dictionary |
|---|---|
| Right | None |
| Left | None |
| Down | None |
| Start | "Start game" |
| A button | "Set" |
| C button | "Button C" |
| B button | "Delete" |
| R button | "Forwards" |
| X button | "Repeat" |
| Y button | "Stop" |
| Z button | "Replay" |
| L button | "Backwards" |

Normal Non-Specific Speaker Voice Recognition Function

The object of this mode is to load a dictionary from a CD-ROM in the game machine 1 and to use it in a game by conducting voice recognition. A dictionary data download command is issued, a dictionary is loaded from the CD-ROM to a RAM in the voice recognition LSI 61, which is omitted from-the diagram, and the voice recognition operation is started by issuing a recognition start command (the rejection level and cluster to be used must be set, as described below). The recognition operation can be halted by issuing a recognition halt command.

In this case, the device may be set such that the dictionary data is downloaded automatically when the power is turned on or the device is reset. If the power to the voice recognition section 6 is turned on or reset, then data from the CD-ROM is automatically transferred to the internal system RAM. Thereupon, substitution with standard pad data is carried out. If data download is conducted automatically in this way, then since no external operation is required, standard data can be used by the application even if the application used is incompatible. Furthermore, by providing standard data in the system in advance, the data volume for each type of application can be cut and the load on the creator of the application can be reduced.

Word Spotting Function

The voice recognition section 6 has a word spotting function whereby the word in the dictionary is isolated from a phrase containing unnecessary sounds'such as the "Errr" in "Errr . . . punch".

Catch up Function

The voice recognition section 6 employs non-specific speaker voice recognition on the basis of the standard pattern memory 61b. However, in some cases, it may be difficult to recognise a user with particularly idiosyncratic pronunciation or specific words. Therefore, it is also possible to achieve improvements in the recognition rate by rewriting words that are difficult to recognize in an independent user voice register. In this case, specific speaker voice recognition is used.

The concrete details of the procedure are as follows. A voice data transfer command is issued to the data register 61a. A desired voice sound is then input to the microphone 7 and the input voice sound is stored in a specific pattern memory 61c.

Microphone Gain Changing Function

The microphone 7 gain can be changed. The gain can be set by issuing a gain setting command to the data register 61a. By means of this function, suitable voice recognition can be achieved with respect to the volume of the speaker's voice, peripheral noise, and the like.

Real time Volume Output Function

The normal recognition mode comprises two recognition modes: a noise switch mode where the voice level is output in real time (every 20 ms), and a recognition mode where normal voice recognition is conducted. In the former, real-time volume output mode, since the voice level only is output, it is possible to conduct processing at extremely high speed. By issuing a mode volume output command, an 8-bit (0–255) voice level signal is output.

One conceivable application of this mode is as follows. After a command has been input from the microphone 7 or PAD 2b, the degree of the action carried out according to that command is determined from the voice level signal. For example, after a "forward" command has been given to character on the screen, the player adds "quickly, quickly" in order to increase the character's speed of movement. Alternatively, if an expression, such as a tearful smile, or the like, is to be applied to the character on the screen, then the intensity of the expression is determined by the volume of the player's voice saying "Ahhh!", or the like. Alternatively, if the character on the screen is walking through dangerous terrain, then when a dangerous situation arises unexpectedly, for instance, an enemy character appears suddenly, by shouting "watch out!", "car!", or the like, the player can make the character slow down its speed of movement, adopt a defensive stance, lower its posture, fall unconscious, or the like, in response to the volume of the player's voice.

Rather than changing the degree of an action, it is also possible to change the type of action by means of the voice level. For example, after a "forward" command has been given to the character on the screen, if the player says "go" is a low voice, the character starts to walk, whereas if the player shouts "GO!!", then the character will jump, or if it has a flying capability, it will fly through the sky.

In brief, it is possible for the degree of an action to be increased or reduced by means of the voice level, or for the type of action to be changed if the voice level exceeds a certain threshold value.

Reject Function

This is a function whereby, during voice recognition, when the score (level) output by the voice recognition LSI 61 together with the similarity level is below a prescribed level, the corresponding recognition result is discarded. For example, if score<(rejection level+1) *8, then the result having the highest similarity ranking will not be output. The reject level may be set to 2, for example. By means of this function, it is possible to prevent recognition errors due to voices other than that of the speaker and noise, etc.

Cluster Function

This is a function whereby the recognition rate and recognition speed can be increased by dividing 30 words for a single scene into a maximum of 16 groups and then conducting voice recognition for a selected group (or plurality of groups).

For example, in order to recognise an incantation, or the like, which is used regularly in a fighting scene of a role playing game (RPG), then a cluster is created for each type of incantation, namely, magic for attacking (cluster 1), magic for recovering (cluster 2), direct attack (cluster 3), other (cluster 4), role (cluster 5), etc. Thereupon, as the fighting scene progresses, the appropriate clusters can be selected in sequence.

Before starting a fight; a word from the role cluster (cluster 5) is recognized. If the recognition result is "fighter", then the character will subsequently take a weapon and engage in a direct attack, so the voice recognition process moves to the direct attack cluster (cluster 3). On the other hand, if the recognition result for the role is "wizard", then the voice recognition process will be applied to the magic for attacking cluster (cluster 1).

In this way, an appropriate cluster which is closely related to the game scene is selected on the basis of the previous recognition result, and it is determined if the voice signal corresponds to any of the words in the selected cluster. By this method, there is little risk that that a completely unrelated word will be recognized in error, so the reliability of recognition is high, and since the words subjected to voice recognition for which a similarity is sought are limited to those in the selected cluster, the number of processing calculations is reduced, which is advantageous in terms of processing speed.

Word Connection Function

This is function whereby a single recognition result is output for two words spoken consecutively. A result is output in this way when the sum of the similarity level for the first word and the similarity level for the second word is high. In this case, it is necessary to store connection data for the two words previously in the dictionary.

For example, the words "monkey", "attack", "pheasant", "defend", "dog", "magic", "devil", "escape", "momotaro" may be contained in the dictionary, and word connection data such as the following may be stored: "attack—monkey", "defend—monkey", "escape—monkey.", "attack—pheasant", "defend—pheasant", "escape—pheasant", "attack—dog", "defend—dog" and "escape—dog". In this way, words and corresponding connection data are stored in the dictionary. "momotaro" is a character from a Japanese fairy tale.

In this case, if the user were to say "attack—monkey" (leaving a slight pause inbetween), then the action of the voice recognition section 6 might correspond to the following cases, for example (sequence in which three words are selected from nine words * 2).

| $1^{st}$ word similarity | $2^{nd}$ word similarity | Recognition result |
|---|---|---|
| Case 1 | | |
| Rank 1 attack | Rank 1 monkey | |
| Rank 2 magic | Rank 2 pheasant | Attack - monkey |
| Rank 3 escape | Rank 3 devil | |
| Case 2 | | |
| Rank 1 attack | Rank 1 pheasant | |
| Rank 2 magic | Rank 2 monkey | Attack - pheasant |
| Rank 3 escape | Rank 3 devil | |
| Case 3 | | |
| Rank 1 attack | Rank 1 devil | |
| Rank 2 magic | Rank 2 monkey | Attack - monkey |
| Rank 3 escape | Rank 3 dog | |
| Case 4 | | |
| Rank 1 magic | Rank 1 devil | |
| Rank 2 attack | Rank 2 monkey | Attack - monkey |
| Rank 3 escape | Rank 3 dog | |

When the aforementioned word connection function is used, the voice recognition section 6 selects an output from three candidates having the $1^{st}$–$3^{rd}$ highest similarity rankings. The words having the $1^{st}$, $2^{nd}$ and $3^{rd}$ highest similarity rankings for the first word are combined with the words having the $1^{st}$, $2^{nd}$ and $3^{rd}$ highest similarity rankings for the second word, and the words having the highest total similarity level are selected. However, if , as in cases 3 and 4 above, a word for which there is no connection data comes highest in the similarity ranking, then this is discarded and a word for which there is connection data is given priority and is output.

Next, the operation of a game machine using a voice recognition section is described.

A game machine of this type is normally controlled by buttons on a pad 2b, but instead of this, or in addition to this, it is possible to use a new operating method by applying a voice recognition device. If the cause for any difference in volume can be identified, then this can be combined with voice recognition to provide a new way of playing a game. In normal voice recognition, it is simply determined whether or not the vocal sound made by the player matches recognition data and the result of this judgement is output, but by appending to this judgement results relating to whether the voice is louder or softer than a certain standard level, it is possible to broaden the scope of application. A concrete example of this is described later.

The voice sound produced is transmitted via the microphone 7 to the voice recognition section 6 which recognizes the voice and the volume, and here it is compared with recognition data and standard volume level data and the result of this comparison are sent to the game machine main unit 1. The game main unit 1 performs a variety of operations depending on the result. The game machine main unit 1 is capable of setting the standard volume level in the voice recognition section 6. The standard volume level also has a default value which can be adjusted.

Next, a concrete example of device operation using a combination of voice recognition and volume level is descried with reference to a game machine.

(Controlling Degree of Action by Voice Level)

For example, after a "forward" command has been issued to a character on the screen, the player cries "faster, faster" to increase the character's speed of movement. Alternatively, when applying an expression, such as a tearful smile etc., to the character, then the intensity of the expression is determined by the volume of the player's voice saying "Ahhh!", or the like. Alternatively, if the character on the screen is walking through perilous terrain, then when a dangerous situation arises unexpectedly, for instance, an enemy character appears suddenly, by shouting "watch out!", "car!", or the like, the player can make the character slow down its speed of movement, adopt a defensive stance, lower its posture, fall unconscious, or the like, in response to the volume of the player's voice. Alternatively, the character can be made to give a, strong kick or a weak kick, depending on the volume level.

Figure 6:
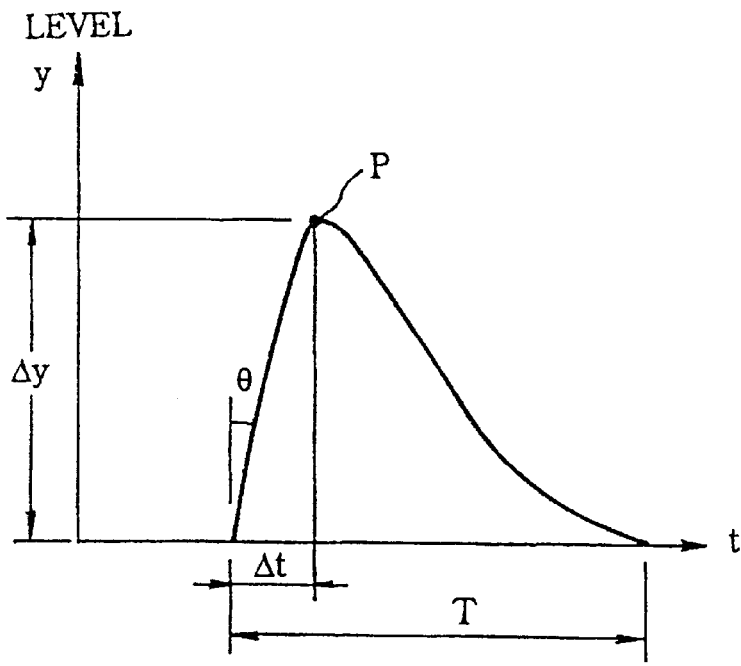
FIG. 6 is an approximate diagram of a voice waveform for describing the action of a voice recognition section relating to a first mode for implementing this invention.
Figure 7:
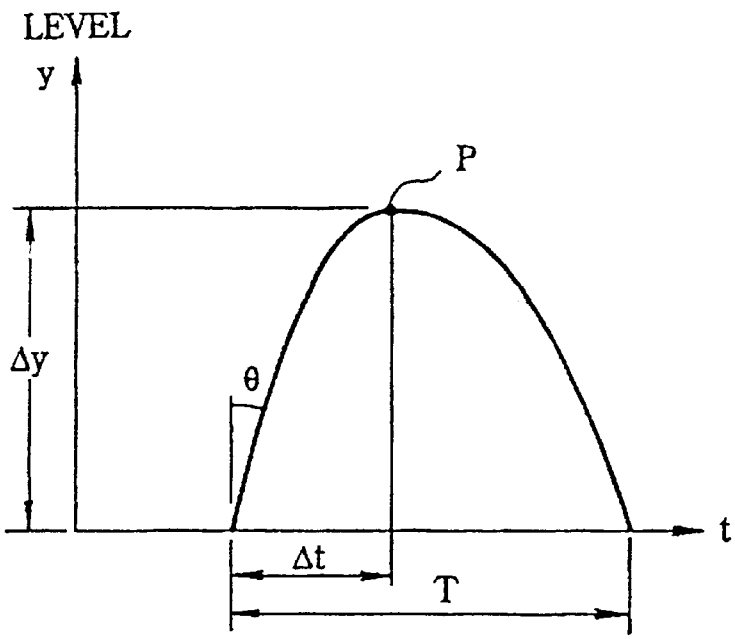
FIG. 7 is an approximate diagram of a voice waveform for describing the action of a voice recognition section relating to a first mode for implementing this invention.

There are several different ways of perceiving the idea of volume level. Players have various ways of speaking, but in conceptual terms, the two examples shown in FIG. 6 and FIG. 7 can be given. The vertical axis in these diagrams is the volume level, and the horizontal axis represents time. In FIG. 6, the initial volume is the loudest, and the volume gradually declines. A voice in an excited state making a sudden call such as "car!", or the like, might change in this way. In FIG. 7, however, the volume rises gradually to a peak, and then declines gradually. A normal voice might change in this way.

Volume level is defined in the following way.

(1) Average Volume

The average is found for the whole signal in FIG. 6 and FIG. 7 and this is taken as the (average) volume. In specific terms, the microphone input signal should be supplied to an integrating circuit. Since the average volume is a value for the whole voice (volume×time of duration), regardless of whether or not the voice is in a normal state or an excited state, it is applied to controlling rates and the degree of simple actions, such as the speed of movement of the character.

(2) Peak Volume

The level $\Delta y$ of the signal peak value (point P in FIG. 6 and FIG. 7) is determined and this is taken as the peak volume. In specific terms, the maximum value is held continuously whilst the signal is sampled using a sample hold circuit., The peak volume represents the maximum volume, and therefore it is suitable for use in cases where there is competition in voice level between a plurality of players.

(3) Rise Time

The time taken to reach the signal peak ($\Delta t$ in FIG. 6 and FIG. 7) is determined and this is taken as the rise time. This can be found easily from the hold timing of the peak hold circuit. Alternatively, the rise time can be defined by means of the rise angle $\theta$, and $\Delta y/\Delta t$. This can be achieved by means of a differentiating circuit. Since the rise time can be regarded as corresponding to the urgency of the voice, then the character can be made to adopt a defensive stance or take retreating action when the rise is sudden, and the character can be made to walk quickly, or the like, when the rise is not sudden.

(4) Continuation Time

The time of duration of the signal (T in FIG. 6 and FIG. 7) is determined, and this is taken as the continuation time. Specifically, the time for which the voice signal continues at or above a predetermined threshold value is measured using a timer (omitted from diagram). The continuation time can be applied readily to cases where there is competition between the length of voices.

(Controlling Type of Action by voice Level)

In addition to the degree of action, the type of action may also be changed by means of the voice level. For example, after a "forward" command has been issued to a character on the screen, if the player says "go" in a soft voice, the character starts to walk, whereas if he or she says "GO!" in a loud voice, the character may jump, or if it has a flying capability, it will fly through the sky.

In brief, the device can be controlled such that the degree of an action is increased or reduced by the voice level, or the type of action is changed depending on whether or not the voice level exceeds a certain threshold value.

(Controlling the type of Action by the Type of Voice)

A distinction can be made between a child's voice and an adult's voice, or between a male voice and a female-voice, and the action can be changed on the basis of this result. For example, if a child character and an adult character are present together, the child character or adult character can be controlled individually depending on the type of voice. This applies similarly to a male and female character. By controlling the device in this way, the game can be played even when a plurality of players speak simultaneously, and hence the game can be broadened in scope.

Incidentally, a child's voice and an adult voice can be identified by the difference in their frequency bands. A male voice and a female voice can also be identified by similar means by the difference in their frequency bands.

(Other)

Special actions can also be implemented by a combination of voice level and/or type of voice, and operation of the buttons on the control pad 2b. For example, the game may be controlled by a combination of a raised voice+operation of button A such that the same move is repeated. Also, in a fighting game where a deathblow is performed when a plurality of buttons are pressed simultaneously, if voice input is assigned to a certain button and normal pad input is assigned to other buttons, then it is possible to effect a similar key input by a more simple method using this combination of voice and pad input, compared to key input using a pad only.

If the voice level is used as described above, the aforementioned real-time volume output function may be used. In other words, the voice recognition mode and real-time volume output mode are combined. Firstly, after carrying out voice recognition and implementing the corresponding action, the device enters real-time volume output mode, and outputs the voice level only. This means that the response is extremely good.

As described above, according to this mode for implementing the invention, it is possible to control the degree of an action on the basis of the voice volume level, such that a game character makes a small movement when the player speaks a word softly, and it makes a large movement when the player speaks a word loudly. Moreover, it is also possible to control the type of action on the basis of the voice volume level. The type of action can also be controlled on the basis of the type of voice.

Second mode for Implementing this Invention

The device according to the first mode for implementing this invention described above adds depth to the control of the device by combining a voice recognition device with a conventional control device in the form of a pad. However, it is also possible to replace the game pad with a voice recognition device.

The voice recognition section 6 in FIG. 3 has a default non-specific speaker voice recognition function and a normal non-specific speaker voice recognition function. Therefore, since prescribed voice sounds correspond to pad buttons even in the default state immediately after switching on the power, it is possible to use a voice recognition device even with software which is not compatible with voice recognition. Furthermore, by issuing a dictionary data load command for the normal non-specific speaker voice recognition function to download a dictionary from a CD-ROM, it is possible to make the relationship between the pad buttons and voice recognition results compatible with the particular software in use.

Next, the processing implemented when a normal non-specific speaker voice recognition function is used will be described.

Firstly, dictionary data is downloaded from a CD-ROM by means of the voice recognition section 6 issuing a dictionary data load command.

Next, the correspondence between the pad 2b buttons and prescribed voice sounds is determined on the basis of the dictionary data. Firstly, voice sounds corresponding to the main unit key switches are defined in the voice data RAM, such that, for example, when the voice sound "forward" is input, key data indicating "up" is output. In this state, when the sound "forward" is input via a microphone as configured in FIG. 1, this data is read into a voice comparing section in the form of digital data, and it is then determined whether or not the same data is present in the voice data RAM. If the data which is the same as the sound input by the microphone is present in the voice data RAM, key data indicating "up" is sent to the game machine main unit 1 in accordance with this data.

When a voice signal is input, the voice recognition section 6 recognizes the voice sound and outputs key data corresponding to normal game pad operation to the game machine main unit 1 on the basis of the correspondence relationships described above. For example, if the player says "start game", then the same signal is output as when the start button is pressed. It is also possible for the player to record his or her preferred voice sounds for each button n the pad. For example, a special command for this purpose is input and then a desired word is selected or input and recorded for each item of pad data. If this is done by selecting text of the TV screen, then non-specific-speaker voice recognition is possible, and if desired words are input via the microphone 7, then specific speaker voice recognition is possible (catch-up function).

In conventional data input devices for game machines, data has been input to the game machine by pressing switches provided on a game pad using the hands, fingers, or the like, but in the method described above, a game can be controlled in the same manner by inputting voice sounds.

Furthermore, by using a voice recognition section 6, it is possible to play the game differently to when using a game pad. In a fighting game, for instance, normally, highly skilled pad operation is required to produce a very difficult manoeuvre, but when a voice recognition section 6 is used, the game can be devised such that this manoeuvre is not produced unless a high level voice input (rapid speech or difficult pronunciation, etc.) is received. It is also possible to combine recognition of voice volume level and voice type.

By using voice sounds to perform key inputs in this way, it is possible to make the game feel more intimate. For example, in a boxing game where button A is assigned to a left-hand punch and button B is assigned to a right-hand punch, the game will be more exciting if punches are thrown by means of the voice sounds "left" and "right", rather then using buttons A and B.

Third Mode for Implementing this Invention

After voice recognition, the voice recognition section 6 outputs a recognized word number and a similarity level. If the rejection level is set when the recognition start command is issued, then it is possible to prevent a recognition result from being output when the similarity level for that result is lower than a set level. By means of this function, it is possible to prevent the voice of someone other than the speaker, or external noise, etc. from being recognized in error.

As well as preventing incorrect recognition, the rejection level can also be applied in the following ways:

Changing Rejection Level According to Game Circumstances

In an adventure game, for example, in a scene where the player's character may die and the game will be over if there is an incorrect recognition of some kind, the rejection level can be set to a high level. In this case, the reliability of the output results is raised at the expense of the response time.

On the other hand, by lowering the rejection level in scenes which are not so important to the progress of the game, the reliability of the output results is reduced, but the response time is improved. Since the game developers can alter these settings as desired, a greater flexibility of control is possible compared to when game pads are used.

Fourth Mode for Implementing this Invention

After voice recognition, the voice recognition section 6 outputs a recognized word number and a similarity level. Therefore, the degree of an action and the type of action can be controlled according to the similarity level.

For example, if a certain word is recognized, the response can be altered depending on the size of the similarity level output by the voice recognition section 6. For example, the force in a punch resulting from an 80 point similarity level will be strong, whilst the force in a punch having a 10 point similarity level will be weak. In this way, the force of a punch can be varied according to the similarity level. In this case, if non-specific speaker voice recognition is applied, the actions of the characters or the development of the game can be changed depending on the player's pronunciation, it being more advantageous if the player's voice conforms to the standard data. The game can also be enjoyed from this point of view (namely, who has the most standard pronunciation? Whose pronunciation is suitable for voice recognition? etc.) Therefore, the players' enjoyment of the game is further enhanced.

This method of control based on the similarity level according to the fourth mode of implementation may also be applied to the specific example described in the first mode of implementing this invention in relation to the voice level.

Fifth Mode of Implementing the Invention

The description in the foregoing embodiments centred on the voice recognition section, but this mode of implementation relates to a game which is played using this voice recognition section.

(1) Action Game for Animal Training Assistance

In this type of game, the player can communicate with animals, such as a dog, cat, horse, or the like, using voice recognition.

Voice recognition can be used to control not just a single character, but a plurality of characters, directly or indirectly. Controlling this type of game by buttons is relatively unappealing, and control by voice, similar to a real-life situation, is more suitable.

Furthermore, in real animal training, the animals sometimes ignore a person's commands. So even if voice recognition does not work perfectly, the impatience that this induces actually becomes a feature of the game, and therefore the appeal of the game is further enhanced. The variety of responses of the character when it is called to is interesting.

Alternatively, an action game can also be envisaged where an animal such as monkey, pheasant, dog, or the like, accompanying the player can be made to move around as the player wishes. In a game based on the story of Momotaro, for instance, the player can befriend animals in a field by actually talking. For example, in order to befriend an animal, the player calls out something nice when the animal he or she wishes to befriend is looking at the player's character. For example, if the animal is a dog, then it will respond if the player calls out "Here boy!" "Here boy!", or the like, a number of times. If the animal is then given some food, it will become the player's companion.

If the player walks somewhere, the animal will follow afterwards, but if it sees something interesting, it will stop and try to go off in that direction. In this case, the animal can be brought back by calling out "Here boy! NOW!", or the like.

Animals always behave in a variety of ways. If the player repeats the same words a number of times for an action involving an animal, the animal will always perform the action corresponding to those words. By means of this repetition, the player can gradually control the animal.

Alternatively, a game where animals clear traps or enemies may also be conceived. This type of game may involve a shepherd leading sheep, for instance.

In a game of this kind, a variety of traps are prepared and the player controls the animals so that they avoid the traps. Animals can get caught in traps that are identified easily by the player, so the player must instruct the animals. As the number of friendly animals increases, the game becomes more difficult. In order to clear the traps and progress onwards, the player must consider how to handle different types of animal.

Alternative games include a tropical fish breeding game, a golden carp breeding game, or the like. The fish can be gathered together not only by voice control but also by an action, such as, clapping hands. By programming the device such that the fish perform a variety of actions depending on how the player claps his or her hands, an interesting way of playing the game can be provided.

(2) Multiple Player Rapid Response Quiz

This relates to a quiz program in a game machine. In this game, there are a plurality of participants and the game machine puts questions to the players in turn, and the players compete to get the highest score. The response words are limited to (1), (2), or (a), (b), . . . etc., which is advantageous in terms of processing speed.

(3) Children's Educational Game

A children's character is made to remember or practice words. The object of this type of game is communication, and it is made more interesting if voice control is used.

(4) Flight Simulation Game

Using a voice recognition section for selecting weapons and other equipment, or for giving commands to a co-pilot, makes the game more realistic.

(5) Mahjong Game

The player can choose hands by making Mahjong calls.

(6) Other

Other conceivable applications include: shogi (Japanese chess), table games, party games (conversation-based games, rather than mouse-based games), number games (kanojo, ocha-shinai, OK, etc.), driving games (radio control), RPG (role playing game) short cuts, conversation-based virtual family games (for elderly people), and war simulation games, etc.

A recording medium is a CD-ROM, cartridge, or the like, on which information (principally digital data and programs) is recorded by some physical means or other, and it is able to cause a processing device, such as a dedicated processor, or the like, to implement prescribed functions. In brief, it should download programs to a computer by some means of other and cause the computer to execute prescribed functions.

Examples of this include floppy disks, hard disks, magnetic tape, magneto-optical disks, CD-ROM, DVD, ROM cartridges, RAM memory cartridges equipped with back-up batteries, flash memory cartridges and non-volatile RAM cartridges.

Wired communications circuits, such as public telephone lines, radio communications circuits, such as microwave circuits, and communications media such as the Internet are also included.

INDUSTRIAL, APPLICABILITY

In a voice recognition device used as a peripheral device in a game machine, since the voice recognition device relating to this invention comprises voice input means, and a voice recognition section for recognizing the player's voice by comparing the voice signal output from this voice input means with data from a previously defined voice recognition dictionary, and generating control signals relating to the game on the basis of the recognition result, a person playing a game can control the game using his or her voice.

In the voice recognition device relating to this invention, since the voice recognition section comprises a non-specific speaker voice recognition dictionary, which is previously defined for unspecified speakers, and a specific speaker voice recognition dictionary which is defined by the player, and in its initial state, the device selects the non-specific speaker voice recognition dictionary, a game based on voice control can be played by means of non-specific speaker voice recognition, even for game software which is not compatible with specific speakers. This is not limited to specialized software, but can be applied to many different types of software, thus broadening the scope of application of the device.

In the voice recognition device relating to this invention, since the voice recognition section comprises a plurality of specific speaker voice recognition dictionaries corresponding respectively to a plurality of players, and one of these specific speaker voice recognition dictionaries is selected by an action of the player as the dictionary to be used for voice recognition processing, it is possible to apply specific speaker voice recognition suing an appropriate dictionary, and the accuracy of voice recognition can be raised.

Since the voice recognition device relating to this invention comprises a game machine control section connected to the voice recognition section, and the voice recognition section generates control signals relating to the game by combining voice recognition results and control signals from the control section, a variety of actions are possible by combining a normal game pad, or the like, and voice recognition, and thus games can be made more interesting. In the voice recognition device relating to this invention, since the control section outputs control signals for implementing normal actions, and the voice recognition section generates control signals for implementing special actions, special actions, which are difficult to execute using a normal game pad etc., can be performed more easily.

In the voice recognition device relating to this invention, since the voice recognition section outputs a value indicating the state of the voice signal and a similarity level indicating the degree of similarity between the voice signal output from the voice input means and the contents of the voice recognition dictionary, and the voice recognition section has a first operating mode, wherein voice recognition is conducted on the basis of the similarity level in order to select the type of game action, and a second operating mode, wherein no voice recognition is conducted and the state of the voice signal is measured in order to set the state of the action, the processing in the second operating mode can be conducted at high speed, and the response is fast, which is beneficial in terms of controlling the game.

In the voice recognition device relating to this invention, since the voice recognition section outputs a similarity level indicating the degree of similarity between the voice signal output from the voice input means and the contents of the voice recognition dictionary, and the corresponding volume level, evaluates this volume level on the basis of a predetermined rejection level, and rejects the recognition result from the voice recognition section depending on this evaluation result, it is possible to avoid voice recognition when an appropriate voice recognition result is not obtainable, and hence recognition errors can be reduced.

Since the voice recognition device relating to this invention sets a rejection level for each type of game or each game stage, an appropriate rejection level can be set for each scene, which is advantageous in playing a game.

In the voice recognition device relating to this invention, since the voice recognition section performs voice recognition on the basis of the similarity level indicating the degree of similarity between the voice signal output from the voice input means and the contents of the voice recognition dictionary, and changes the state of action in the game according to control signals generated on the basis of this recognition result, in response to this similarity level, special actions, which are difficult to execute using a normal game pad, or the like, can be performed more easily.

What is claimed is:

1. A voice recognition device used as a peripheral device for a game machine, the voice recognition device comprising:

voice input means for receiving a player's voice and outputting a voice signal;

a voice recognition section for recognizing the player's voice by comparing the voice signal output from said voice input means with data from previously defined voice recognition dictionaries, and generating control signals relating to the game on the basis of the recognition results; and a game machine control section connected to said voice recognition section;

wherein said voice recognition results from said voice recognition section and control data from said game machine control section such that control of the game machine control section and the player's voice input to the voice recognition section;

said voice recognition section outputs a value indicating a state of the voice signal output from said voice input means and a similarity level indicating the degree of similarity between said voice signal and the contents of said voice recognition dictionary, and said voice recognition section has a first operating mode, wherein voice recognition is conducted on the basis of the state of the voice signal and the similarity level in order to select the type of game action, and a second operating mode, wherein no voice recognition is conducted and the state of said voice signal is measured in order to select the type of game action; and in said second operating mode, said voice recognition section determines a type of voice based on the state of said voice signal, and sets the state of the game action on the basis of the type of voice.

2. A voice recognition device according to claim 1, wherein said voice recognition section comprises, as said voice recognition dictionaries, a non-specific speaker voice recognition dictionary, which is previously defined for unspecified speakers, and a specific speaker voice, recognition dictionary which is defined by the player, and in its initial state, the device selects said non-specific speaker voice recognition dictionary.

3. A voice recognition device according to claim 2, wherein said voice recognition section comprises a plurality of specific speaker voice recognition dictionaries corresponding respectively to a plurality of players, and one of these specific speaker voice recognition dictionaries is selected by an action of the player as the dictionary to be used for voice recognition processing.

4. A voice recognition device according to claim 3, wherein said control section outputs control signals for implementing normal actions, and said voice-recognition section generates control signals for implementing special actions.

5. A voice recognition device according to claim 1, wherein said voice recognition section outputs a value indicating a state of the voice signal output from said voice input means and a similarity level indicating the degree of similarity between said voice signal and the contents of said voice recognition dictionary, and said voice recognition section has a first operating mode, wherein voice recognition is conducted on the basis of the state of the voice signal and the similarity level in order to select the type of game action, and a second operating mode, wherein no voice recognition is conducted and the state of said voice signal is measured in order to select the type of game action.

6. A voice recognition device according to claim 1, wherein said voice recognition section outputs a similarity level indicating the degree of similarity between the voice signal output from said voice input means and the contents of said voice recognition dictionary, and the corresponding volume level, evaluates this volume level on the basis of a predetermined rejection level, and rejects the recognition result from said voice recognition section depending on this evaluation result.

7. A voice recognition device according to claim 6, sets said rejection level for each type of game or each game stage.

8. A voice recognition device according to claim 1, wherein said voice recognition section performs voice recognition on the basis of the similarity level indicating the degree of similarity between said voice signal output from the voice input means and the contents of said voice recognition dictionary, and changes the state of action in the game according to control signals generated on the basis of the recognition result, in response to said similarity level.

9. A game machine comprising a peripheral control device including a voice recognition device according to any of claims 1 to 8.

10. A voice recognition device used as a peripheral device for a game machine, the voice recognition device comprising:
    voice input means for receiving a player's voice and outputting a voice signal;
    a voice recognition section for recognizing the player's voice by comparing the voice signal output from said voice input means with data from previously defined voice recognition dictionaries, and generating control signals relating to the game on the basis of the recognition results; and
    a game machine control section connected to said voice recognition section;
    wherein said voice recognition results from said voice recognition section and control data from said game machine control section such that control of the game machine control section and the player's voice input to the voice recognition section;
    said voice recognition section outputs a value indicating a state of the voice signal output from said voice input means and a similarity level indicating the degree of similarity between said voice signal and the contents of said voice recognition dictionary, and said voice recognition section has a first operating mode, wherein voice recognition is conducted on the basis of the state of the voice signal and the similarity level in order to select the type of game action, and a second operating mode, wherein no voice recognition is conducted and the state of said voice signal is measured in order to select the type of game action; and
    in said second mode, said voice recognition section determines an average sound level of a part or all of the voice signal based on the state of said voice signal, and sets the state of the game action on the basis of this average sound level.

11. A voice recognition device used as a peripheral device for a game machine, the voice recognition device comprising:
    voice input means for receiving a player's voice and outputting a voice signal;
    a voice recognition section for recognizing the player's voice by comparing the voice signal output from said voice input means with data from previously defined voice recognition dictionaries, and generating control signals relating to the game on the basis of the recognition results; and
    a game machine control section connected to said voice recognition section;
    wherein said voice recognition results from said voice recognition section and control data from said game machine control section such that control of the game machine control section and the player's voice input to the voice recognition section;
    said voice recognition section outputs a value indicating a state of the voice signal output from said voice input means and a similarity level indicating the degree of similarity between said voice signal and the contents of said voice recognition dictionary, and said voice recognition section has a first operating mode, wherein voice recognition is conducted on the basis of the state of the voice signal and the similarity level in order to select the type of game action, and a second operating mode, wherein no voice recognition is conducted and the state of said voice signal is measured in order to select the type of game action; and
    in said second mode, said voice recognition section determines a peak sound level of said voice signal based on the state of the voice signal, and sets the state of the game action on the basis of this peak sound level.

12. A voice recognition device used as a peripheral device for a game machine, the voice recognition device comprising:
    voice input means for receiving a player's voice and outputting a voice signal;
    a voice recognition section for recognizing the player's voice by comparing the voice signal output from said voice input means with data from previously defined voice recognition dictionaries, and generating control signals relating to the game on the basis of the recognition results; and
    a game machine control section connected to said voice recognition section;
    wherein said voice recognition results from said voice recognition section and control data from said game machine control section such that control of the game machine control section and the player's voice input to the voice recognition section;
    said voice recognition section outputs a value indicating a state of the voice signal output from said voice input means and a similarity level indicating the degree of similarity between said voice signal and the contents of said voice recognition dictionary, and said voice recognition section has a first operating mode, wherein voice recognition is conducted on the basis of the state of the voice signal and the similarity level in order to select the type of game action, and a second operating mode, wherein no voice recognition is conducted and the state of said voice signal is measured in order to select the type of game action; and
    in said second mode, said voice recognition section determines a voice signal rise time based on the state of said voice signal, and sets the state of the game action on the basis of this rise time.

13. A voice recognition device used as a peripheral device for a game machine, the voice recognition device comprising:

voice input means for receiving a player's voice and outputting a voice signal;

a voice recognition section for recognizing the player's voice by comparing the voice signal output from said voice input means with data from previously defined voice recognition dictionaries, and generating control signals relating to the game on the basis of the recognition results; and a game machine control section connected to said voice recognition section;

wherein said voice recognition results from said voice recognition section and control data from said game machine control section such that control of the game machine control section and the player's voice input to the voice recognition section;

said voice recognition section outputs a value indicating a state of the voice signal output from said voice input means-and a similarity level indicating the degree of similarity between said voice signal and the contents of said voice recognition dictionary, and said voice recognition section has a first operating mode, wherein voice recognition is conducted on the basis of the state of the voice signal and the similarity level in order to select the type of game action, and a second operating mode, wherein no voice recognition is conducted and the state of said voice signal is measured in order to select the type of game action; and in said second mode, said voice recognition section determines a voice signal continuation time based on the state of said voice signal, and sets the state of the game action on the basis of this continuation time.

14. A voice recognition method for use in a controlling operation of a game, comprising:

a first step wherein a voice signal is received;

a second step wherein a player's voice is recognized by comparing said voice signal with data from previously defined voice recognition dictionaries;

a third step where control signals relating to the game are generated on the basis of the recognition result from said second step; and a fourth step of using control data to control the operation of the game;

wherein in said third step, control signals for controlling the game are generated by combining the voice recognition result from said second step and the control data from said fourth step, such that control of the game is determined based on the relationship between the control data from the fourth step and the player's voice input in the second step;

in said second step, a value indicating the state of the voice signal and a similarity level indicating the degree of similarity between said voice signal and the contents of the voice recognition dictionary are output such that in a first operating mode, voice recognition is conducted on the basis of the similarity level in order to select a type of game action, and in a second operating mode, no voice recognition is conducted and the state of said voice signal is measured in order to set the state of the action; wherein in the second operating mode, the type of voice is determined based on the voice signal, and the state of the game action is set based on the type of voice.

15. The voice recognition method according to claim 14, wherein said previously defined voice recognition dictionaries include a non-specific speaker voice recognition dictionary which is previously defined for unspecified speakers, and a specific speaker voice recognition dictionary which is defined by a player, such that in an initial state said non-specific speaker voice recognition dictionary is selected.

16. The voice recognition method according to claim 14, wherein said previously defined voice recognition dictionaries includes a plurality of specific speaker voice recognition dictionaries and a player selects one of a plurality of specific speaker voice recognition dictionaries to be used for voice recognition processing.

17. The voice recognition method according to claim 14, wherein the fourth step, the control data is used to perform normal actions, and in the third step, the control signals are used to perform special actions.

18. The voice recognition method according to claim 14, wherein the state of the game action is changed in accordance with the control signals generated on the basis of the recognition result, in response to said similarity level.

19. The voice recognition method according to claim 14, wherein in the second step, a volume level is output and evaluated such that is the third step, the voice signal is rejected when the volume level exceed as desired rejection level.

20. The voice recognition method according to claim 19, wherein said rejection level is set for each type of game or each game stage.

* * * * *